(12) United States Patent
Wu et al.

(10) Patent No.: US 7,913,263 B2
(45) Date of Patent: Mar. 22, 2011

(54) EXTERNAL DEVICE AND OPERATING METHOD APPLIED THERETO

(75) Inventors: Shuenn-Ru Wu, Taipei (TW); Wen-Che Lee, Taipei (TW)

(73) Assignee: Avermedia Technologies, Inc., Taipei Hsien (TW)

( * ) Notice: Subject to any disclaimer, the term of this patent is extended or adjusted under 35 U.S.C. 154(b) by 1101 days.

(21) Appl. No.: 11/623,401

(22) Filed: Jan. 16, 2007

(65) Prior Publication Data

US 2007/0288936 A1 Dec. 13, 2007

(30) Foreign Application Priority Data

May 19, 2006 (TW) .............................. 95117969 A

(51) Int. Cl.
*G06F 13/00* (2006.01)
(52) U.S. Cl. ...................................... 719/321; 719/327
(58) Field of Classification Search .................. 719/321, 719/327
See application file for complete search history.

(56) References Cited

U.S. PATENT DOCUMENTS

| 6,471,592 | B1 | 10/2002 | Tanaka |
| 6,813,650 | B1 * | 11/2004 | Cato et al. ........................ 710/14 |
| 6,813,669 | B1 * | 11/2004 | Cato et al. ..................... 710/302 |
| 6,862,678 | B1 | 3/2005 | Kao et al. |

FOREIGN PATENT DOCUMENTS

| EP | 1566726 A1 | 8/2005 |
| JP | 2005115427 A | 4/2005 |
| JP | 2006146638 A | 6/2006 |
| TW | 480401 | 3/2002 |
| WO | 03073422 A | 9/2003 |

* cited by examiner

*Primary Examiner* — Andy Ho
(74) *Attorney, Agent, or Firm* — Kirton & McConkie; Evan R. Witt

(57) ABSTRACT

An external device is used with a backend host operated with an operating system. The external device has a program and receives incoming data. The external device is operated with the backend host according to an operating method including the following steps. Firstly, the external device is connected to the backend host, and the external device is recognized by the operating system. Then, the external device is reconnected to the backend host to have the operating system recognize the external device as a memory device when the external device is unrecognizable by the operating system, so that the program is accessible and executable by the operating system to control the external device, or the external device converts the incoming data into at least one data file complying with the access format of a certain program in the operating system.

11 Claims, 4 Drawing Sheets

EXTERNAL DEVICE AND OPERATING METHOD APPLIED THERETO

FIELD OF THE INVENTION

The present invention relates to an external device, and more particularly to an external device for use with a backend host. The present invention also relates to an operating method used between the external device and the backend host.

BACKGROUND OF THE INVENTION

With increasing development of digitalized technologies, a variety of digital products are designed in views of convenience and user-friendliness. Nowadays, many electrical appliances are widely used with personal computers due to the amazing power of the personal computers. The personal computers are developed to meet a so-called "plug and play" requirement to increase convenience and operating efficiency of the personal computers. For example, an interface card complying with the specification of a peripheral component interconnect (PCI) interface or a PCI Express (PCIe) interface can be installed in the computer system to implement some functions of for example displaying images, producing sound effects, processing video data or connecting with network. When an operating system, operated by the computer system, such as Windows, Linux, Mac and the like detects the presence of an interface card and a corresponding driver is loaded, the interface card is enabled. It is of course that the driver should be previously installed in the computer system by for example loading the driver from a storage medium.

For meeting the "plug and play" requirement, a universal serial bus (USB) interface is utilized. That is, an external device is communicated with the computer system via the USB interface in hot-plugging and unplugging manners without shutting down the computer system. The common USB external devices include mice, keyboards, printers, flash drives, digital cameras and the like. The USB external devices further include a variety of memory cards in different formats such as SD, MS, CF or SM memory cards. By means of corresponding card readers, the data stored in the memory cards can be read by the computer system. When the USB external devices such as mice or keyboards are electrically connected to the USB interfaces of the personal computer, the operating system of the personal computer may recognize the presence of these USB external devices. If the operating system supports the drivers of these USB external devices, the USB external devices will be activated when being plugged into the USB interfaces of the personal computer. It is of course that the driver should be previously installed in the computer system to execute specified application programs for the USB external devices.

Nowadays, many products are developed according to embedded system technologies. Since the products are characterized by special functions, the embedded systems of these products are designed in views of certain functions. In contrast, the operating system of the personal computer can support a broader application range. For examples, mobile computing devices such as mobile phones, personal digital assistants (PDAs) or global positioning system (GPS), handheld game consoles and set-top boxes are typical products fabricated according to embedded system technologies. As known, the embedded products have limited memory capacity and specified operating systems are needed. If no driver supporting the operating system has been previously installed in the embedded products, the external devices as described above may fail to be normally operated with the embedded products. In comparison with the personal computer, it is harder to install the driver of the external device in the embedded product and thus the working efficiency of the embedded product cannot be easily increased.

An exemplary embedded product includes a portable media player (PMP). With increasing development of software for the portable media player, it is impossible to pre-install all drivers and application programs in the portable media player. If a corresponding adapter such as a TV adapter or a network adapter is plugged into an interface device of the portable media player, the portable media player may execute the functions of playing TV programs or connecting to the network. Unfortunately, if the adapter is not recognized by the portable media player or no driver has been previously installed, the functions of playing TV programs or connecting to the network cannot be successfully executed. Moreover, if a notebook computer without an optical disc drive is used, the driver for a CardBus wireless network card may cannot be installed via an optical disc drive or downloaded via the network. Under this circumstance, the wireless network card is not recognized or supported by the operating system of the notebook computer and thus fails to be normally operated.

In other words, when the interface device of an embedded product, a computer system or a similar backend host is communicated with an external device, the functions of the external devices fail to be controlled by the backend host in some instances. For example, these instances occur when the external device is not recognized by the backend host, no driver for the external device has been installed in the backend host, and the driver for the external device fails to be downloaded to the backend host.

In views of the above-described disadvantages resulted from the prior art, the applicant keeps on carving unflaggingly to develop an external device for use with a backend host according to the present invention through wholehearted experience and research.

SUMMARY OF THE INVENTION

An object of the present invention is to provide an operating method used between an external device and a backend host, in which a certain program stored in the external device or a data file converted by the external device is utilized to control the external device when the external device is unrecognizable by the operating system of the backend host.

In accordance with a first aspect of the present invention, there is provided an operating method used between an external device and a backend host operated with an operating system. The external device stores a program therein. The operating method includes the following steps. Firstly, the external device is connected to the backend host, and the external device is recognized by the operating system. Then, the external device is reconnected to the backend host to have the operating system recognize the external device as a memory device when the external device is unrecognizable by the operating system, so that the program is accessible and executable by the operating system to control the external device.

In an embodiment, the operating method further comprises the following steps. The external device is recognized within a predetermined time period. The external device is deemed recognizable if the operating system successfully recognizes the external device within the predetermined time period, and the external device is deemed unrecognizable if the operating system fails to recognize the external device within the predetermined time period. Then, the external device is initialized by the operating system when the external device is recognizable by the operating system, so that the external device is well controlled by the backend host.

In an embodiment, the operating system recognizes the external device according to the identity, the identification code or other attributes of the external device, and the external device is unrecognizable by the operating system when no information associated with the external device is realized by the operating system.

In an embodiment, the step of reconnecting the external device to the backend host includes automatically disconnecting the communication between the external device and the backend host and then connecting the external device to the backend host to have the operating system recognize the external device as a memory device.

In an embodiment, the program includes a driver and an application program.

In an embodiment, the operating method further comprises the following steps. The external device, which is recognized as the memory device, is initiated by the operating system, so that the driver and the application program stored in the external device are accessible to the operating system. Then, by automatically disconnecting the communication between the external device and the backend host and then connecting the external device to the backend host to have the operating system correctly recognize the external device, the external device is reconnected to the backend host after the driver is downloaded into the operating system, thereby controlling the external device.

In an embodiment, the operating method further comprises a step of executing the application program provided by the external device to control the external device when the driver fails to be downloaded into the operating system but the application program is executable.

In an embodiment, the backend host is a computer system or an embedded system, and the external device is a CardBus device or a functional adapter.

In accordance with a second aspect of the present invention, there is provided an operating method used between an external device and a backend host operated with an operating system. Incoming data are received by the external device. The operating method includes steps of connecting the external device to the backend host and recognizing the external device by the operating system, and reconnecting the external device to the backend host to have the operating system recognize the external device as a memory device when the external device is unrecognizable by the operating system, and allowing the external device to convert the incoming data into at least one data file complying with the access format of a certain program in the operating system.

In an embodiment, the external device has a driver and an application program stored therein, and the external device, which is recognized as the memory device, is initialized by the operating system, so that the driver and the application program stored in the external device are accessible to the operating system.

In an embodiment, the operating method further comprises a step of executing an accessory program of the operating system to open the data file to be read or written when the driver fails to be downloaded into the operating system and the application program is not executable.

In an embodiment, the operating system recognizes the external device according to the identity, the identification code or other attributes of the external device, and the external device is unrecognizable by the operating system when no information associated with the external device is realized by the operating system.

In an embodiment, the step of reconnecting the external device to the backend host includes automatically disconnecting the communication between the external device and the backend host and then connecting the external device to the backend host to have the operating system recognize the external device as a memory device.

In an embodiment, the incoming data are converted into the at least one data file by encoding operation, decoding operation, code conversion, or data editing operation.

In an embodiment, the data file is a virtual file executable by the certain program in the operating system, so that the operating status of the external device is inquired and the operations of the external device are controlled by the operating system.

In an embodiment, the backend host is a computer system or an embedded system, and the external device is a CardBus device or a functional adapter.

In accordance with a third aspect of the present invention, there is provided an external device for use with a backend host operated with an operating system. The external device stores a program therein and receives incoming data. The external device is operated with the backend host according to an operating method including the following steps. Firstly, the external device is connected to the backend host, and the external device is recognized by the operating system. Then, the external device is reconnected to the backend host to have the operating system recognize the external device as a memory device when the external device is unrecognizable by the operating system, so that the program set is accessible and executable by the operating system to control the external device and the backend host, or the external device converts the incoming data into at least one data file complying with the access format of a certain program in the operating system.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1A:
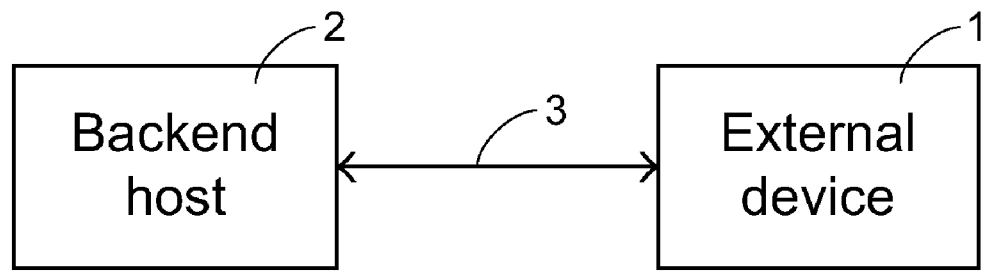
FIG. 1(a) is a schematic function block diagram illustrating an external device 1 for use with a backend host 2 according to a preferred embodiment of the present invention.

Referring to FIG. 1(a), a schematic function block diagram of an external device 1 for use with a backend host 2 according to a preferred embodiment of the present invention is illustrated. The external device 1 is communicated with the backend host 2 via an adapter interface 3. Hereinafter, the operation of the external device 1 together with the backend host 2 will be illustrated. First of all, a CardBus interface is plugged into a computer system or an adapter is connected to an embedded product. For example, a TV adapter is inserted into a portable media player or a handheld game console. The adapter interface 3 includes but is not limited to a USB interface, a CardBus interface, an adapter interface or an adapter card interface. The adapter interface 3 is compatible with both the external device 1 and the backend host 2. When the external device 1 is communicated with the backend host 2 via the adapter interface 3, the operating system of the backend host 2 will recognize the external device 1. If the external device 1 is unrecognizable, the backend host 2 fails to control operations of the external device 1.

As previously described, since the backend host 2 is an embedded product, the backend host 2 has limited memory capacity and the development of the operating system for the backend host 2 is restricted. It is necessary to use an external adapter or adapter card to extend functions of the backend host 2.

Figure 1B:
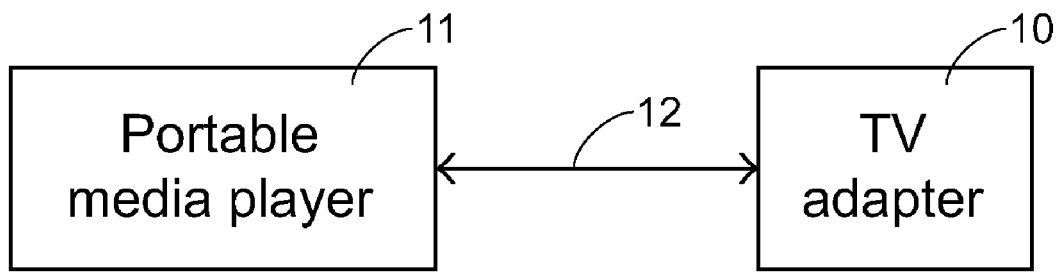
FIG. 1(b) is a schematic function block diagram illustrating a TV adapter 10 for use with a portable media player 11 according to another preferred embodiment of the present invention.

Referring to FIG. 1(b), a schematic function block diagram of a TV adapter 10 for use with a portable media player 11 according to another embodiment of the present invention is illustrated. In comparison with FIG. 1(a), the external device 1 is represented by the TV adapter 10, and the backend host 2 is represented by the portable media player 11 in this embodiment. The portable media player 11 is an embedded product, and has a specified operating system applicable to this embedded system. The portable media player 11 has an adapter interface such as a USB interface 12. The TV adapter 10 is communicated with the portable media player 11 via the USB interface 12. The TV adapter 10 can receive the TV signals from a cable TV or a local television station in a wired or wireless transmission manner. The TV signals can be transmitted to the portable media player 11 through the USB interface 12, so that the TV programs may be displayed on the portable media player 11.

In this embodiment, when the TV adapter 10 is connected to the portable media player 11, the operating system of the portable media player 11 will recognize which hardware is connected thereto. That is, the operating system of the portable media player 11 will identify the identity, the identification code or other attributes of the TV adapter 10. In a case that no driver supporting the TV adapter 10 has been installed in the portable media player 11, the operating system of the portable media player 11 may fail to recognize the presence of the TV adapter 10. As a consequence, the portable media player 11 fails to control operations of the TV adapter 10. For solving these problems, the TV adapter 10 stores therein a driver and an application program for controlling operations of the TV adapter 10. In a case that the TV adapter 10 is unrecognized by the operating system of the portable media player 11, the TV adapter 10 will be recognized as a memory device or a mass storage device such as a flash drive or a memory card. It is of course that the operating system is capable of recognizing the external memory device or hard disc. Under this circumstance, the driver and application program contained in the TV adapter 10 are accessible and executable by the operating system because the TV adapter 10 are recognized as a memory device.

Figure 2A:
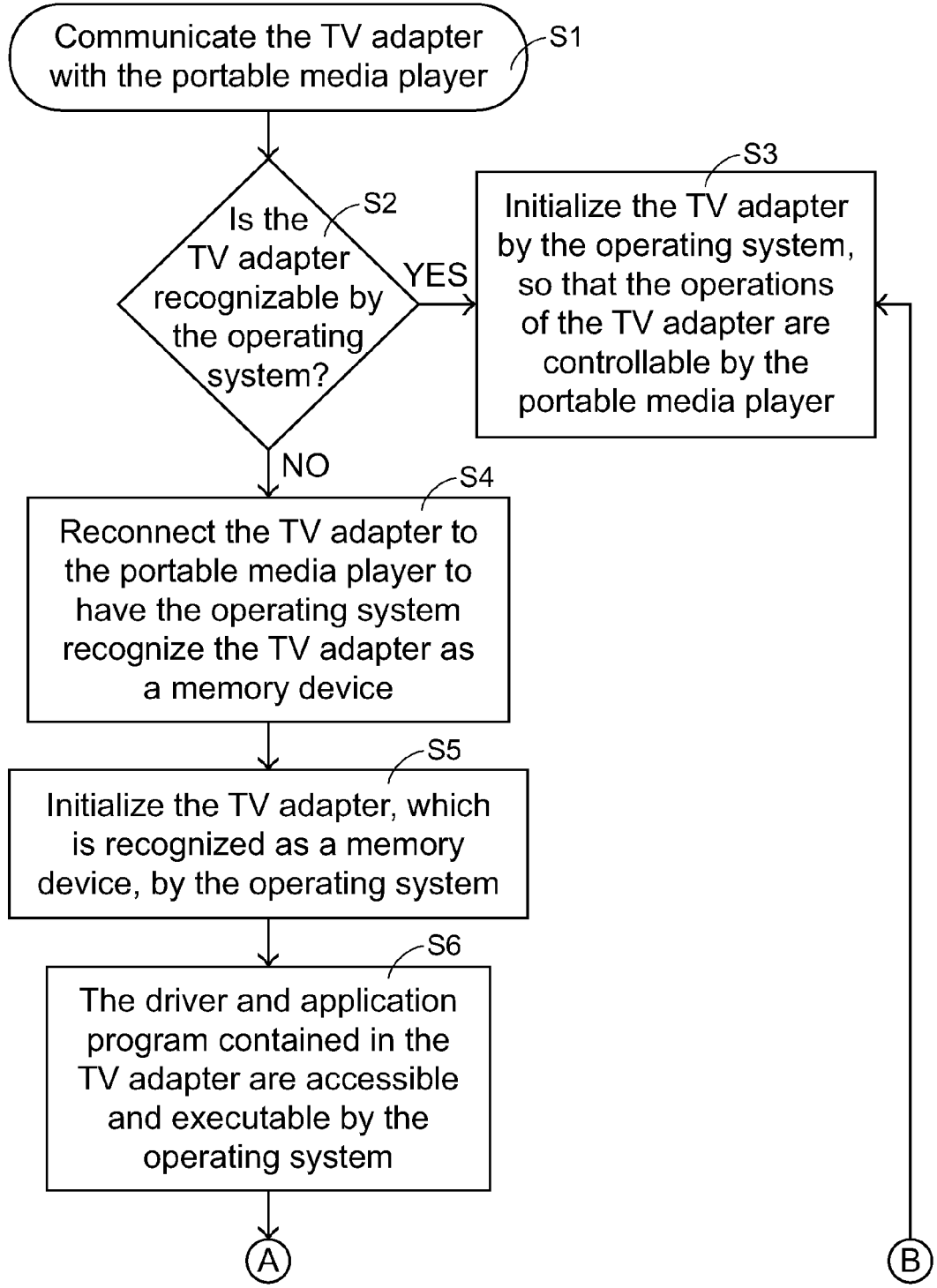
FIGS. 2(a) and 2(b) illustrate a flowchart showing an operating method applied to the TV adapter 10 and the portable media player 11.
Figure 2B:
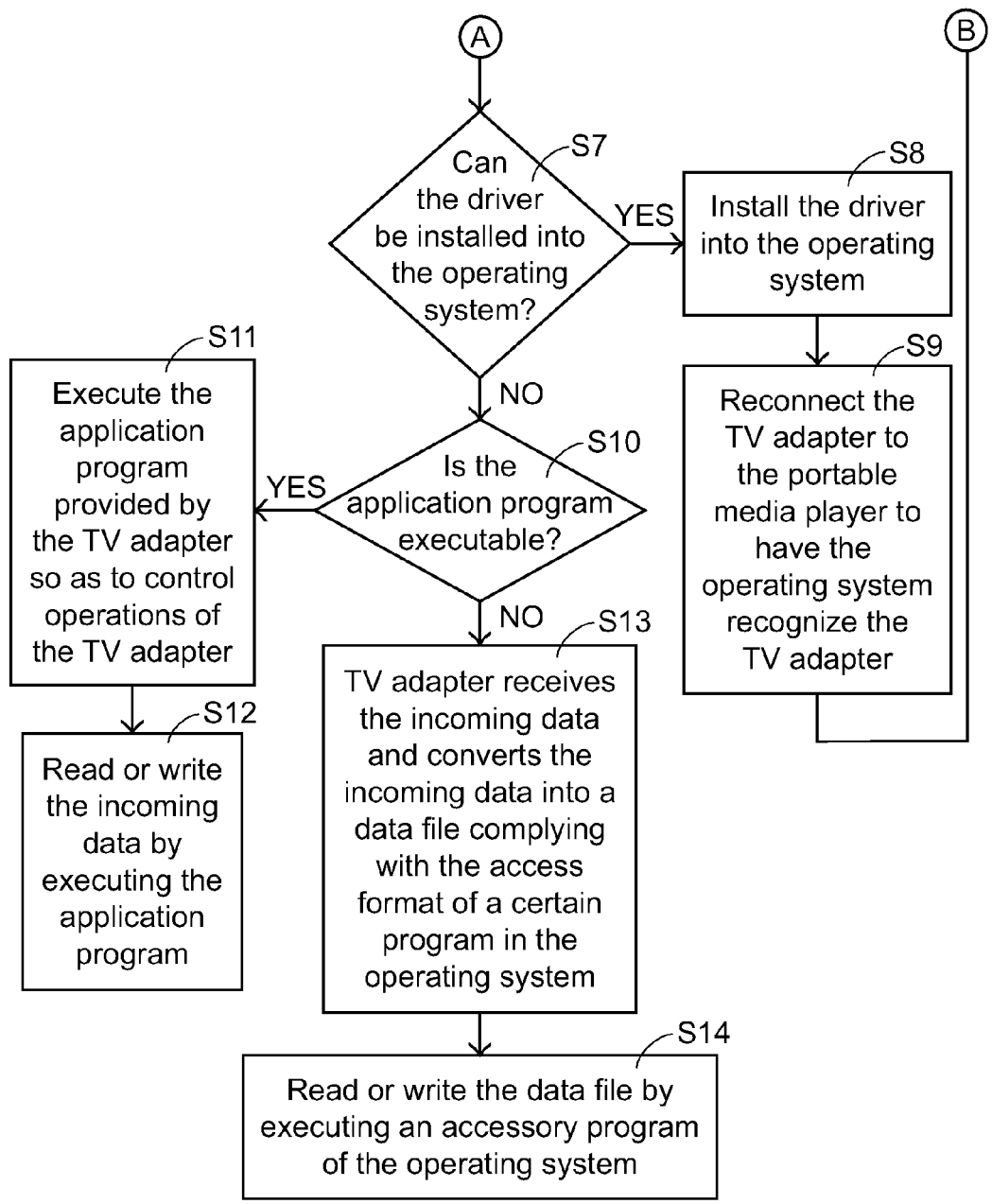

Hereinafter, a flowchart of an operating method applied to the external device and the backend host will be illustrated with reference to FIGS. 2(a) and 2(b). First of all, the TV adapter 10 is plugged in the portable media player 11, so that the TV adapter 10 is communicated with the portable media player 11 (Step S1). If the TV adapter 10 is recognizable by the operating system of the portable media player 11 (Step S2), the operating system of the portable media player 11 will initialize the TV adapter 10, so that the operations of the TV adapter 10 are controllable by the portable media player 11 (Step S3). Otherwise, the TV adapter 10 is reconnected to the portable media player 11 to have the operating system recognize the TV adapter 10 as a memory device (Step S4). In step S2, the TV adapter 10 should be recognized within a predetermined time period measured by a timer of the operating system. For example, in a case that the operating system can recognize the TV adapter 10 within the predetermined time period, the TV adapter 10 is recognizable. Otherwise, the TV adapter 10 is unrecognizable.

As described in step S4, for reconnecting the TV adapter 10 to the portable media player 11, the communication between the TV adapter 10 and the portable media player 11 is automatically disconnected and then the TV adapter 10 is connected to the portable media player 11 to have the operating system recognize the TV adapter 10 as a memory device. After the TV adapter 10 is recognized as a memory device (Step S4), the operating system of the portable media player 11 will initialize the TV adapter 10, which is recognized as a memory device (Step S5). Meanwhile, the driver and application program contained in the TV adapter 10 are accessible and executable by the operating system (Step S6). If the driver can be automatically or manually downloaded into the operating system (Step S7), the driver is downloaded and installed in the portable media player 11 (Step S8). After the driver and optionally the application program are downloaded into the operating system, the TV adapter 10 is reconnected to the portable media player 11 to have the operating system recognize the TV adapter 10 as a TV adapter according to the identification code or the device information thereof (Step S9). Similarly, for reconnecting the TV adapter 10 to the portable media player 11, the communication between the TV adapter 10 and the portable media player 11 is automatically disconnected and then the TV adapter 10 is connected to the portable media player 11 to have the operating system recognize the TV adapter 10 as a TV adapter. Since the driver for the TV adapter 10 has been downloaded and installed in the portable media player 11, the TV adapter 10 is recognizable by the operating system of the portable media player 11 and thus the operations of the TV adapter 10 are controllable by the portable media player 11.

Whereas, if the driver fails to be downloaded into the operating system but the application program is executable (Step S10), the user may execute the application program provided by the TV adapter 10 so as to control operations of the TV adapter 10 (Step S11). By means of the application program, incoming data received by the TV adapter 10 can be read or written (Step S12). In this embodiment, the incoming data are TV signals issued from a cable TV or a local television station in a wired or wireless transmission manner. The application program is a kind of program basic to the application of the TV adapter 10 and is executable by the portable media player 11. The functions provided by the application program include signal encoding/decoding operation, code conversion, signal format conversion, data editing operation and the like. Since the processed TV signals from the TV adapter 10 have the signal formats recognizable by the operating system of the portable media player 11, the processed TV signal will be displayed on the portable media player 11. Because the driver fails to be downloaded into the operating system but the application program can be directly executed by the TV adapter 10, the TV adapter 10 is still recognized as the memory device by the operating system. In other words, the application program should be executed through the interface of the memory device, thereby achieving similar functions of downloading and executing the driver. As a consequence, the user may execute the application program provided by the TV adapter 10 to read and/or write the incoming data without downloading the driver.

Whereas, if the driver fails to be downloaded into the operating system (Step S7) and the application program fails to be executed (Step S10), the TV adapter 10 will receive the incoming data and convert the incoming data into a data file complying with the access format of a certain program in the operating system (Step S13). Subsequently, by executing an accessory program of the operating system, the data file can be read or written (Step S14). Since the driver fails to be downloaded into the operating system and the application program fails to be executed by the TV adapter 10, the incoming data after being processed for example through signal encoding/decoding operation, signal format conversion, data editing operation by the TV adapter 10 are unrecognizable to the portable media player 11. Nevertheless, since the operating system of the portable media player 11 is designed according to embedded system technologies, there are many available accessory programs supporting the operation of the data file. For example, the operating system of the portable media player 11 has an available accessory program such as "Media Player". Consequently, the TV signals issued from a cable TV or a local television station in a wired or wireless transmission manner will be converted into one or more data files. The data files include one or more virtual files in an extension name of "*.WMV" or "*.WMA", and comply with the specifications of the video files executable by the accessory program "Media Player". That is, by executing the accessory program of the operating system, the data file can be read or written. Moreover, the operating system can inquire the operating status of the TV adapter 10 and thus control operations of the TV adapter 10. Under this circumstance, the functions of the TV adapter 10 are normally performed even if the driver fails to be downloaded into the operating system and the application program fails to be executed by the TV adapter 10.

In the above embodiment, the TV adapter 10 is used to receive the cable or wireless TV signals and also serves as a memory device. The TV signals will be processed by the TV adapter 10 into a readable file, which is then stored in the memory device. That is, a switching member (not shown) can be mounted on the TV adapter 10 to control the operating mode of the TV adapter 10. In a case that the TV adapter 10 is recognizable by the operating system, the TV adapter 10 and the operating system are operated in a normal operating mode. Whereas, in another case that the TV adapter 10 is unrecognizable by the operating system, the application program needs to be executed or the data file needs to be read by the operating system to control the TV adapter 10. That is, the TV adapter 10 operated in a storage mode to receive the incoming data. By means of the switching member, the TV adapter 10 and the operating system are operated in either the normal operating mode or the storage mode depending on the user's requirements.

Figure 3:
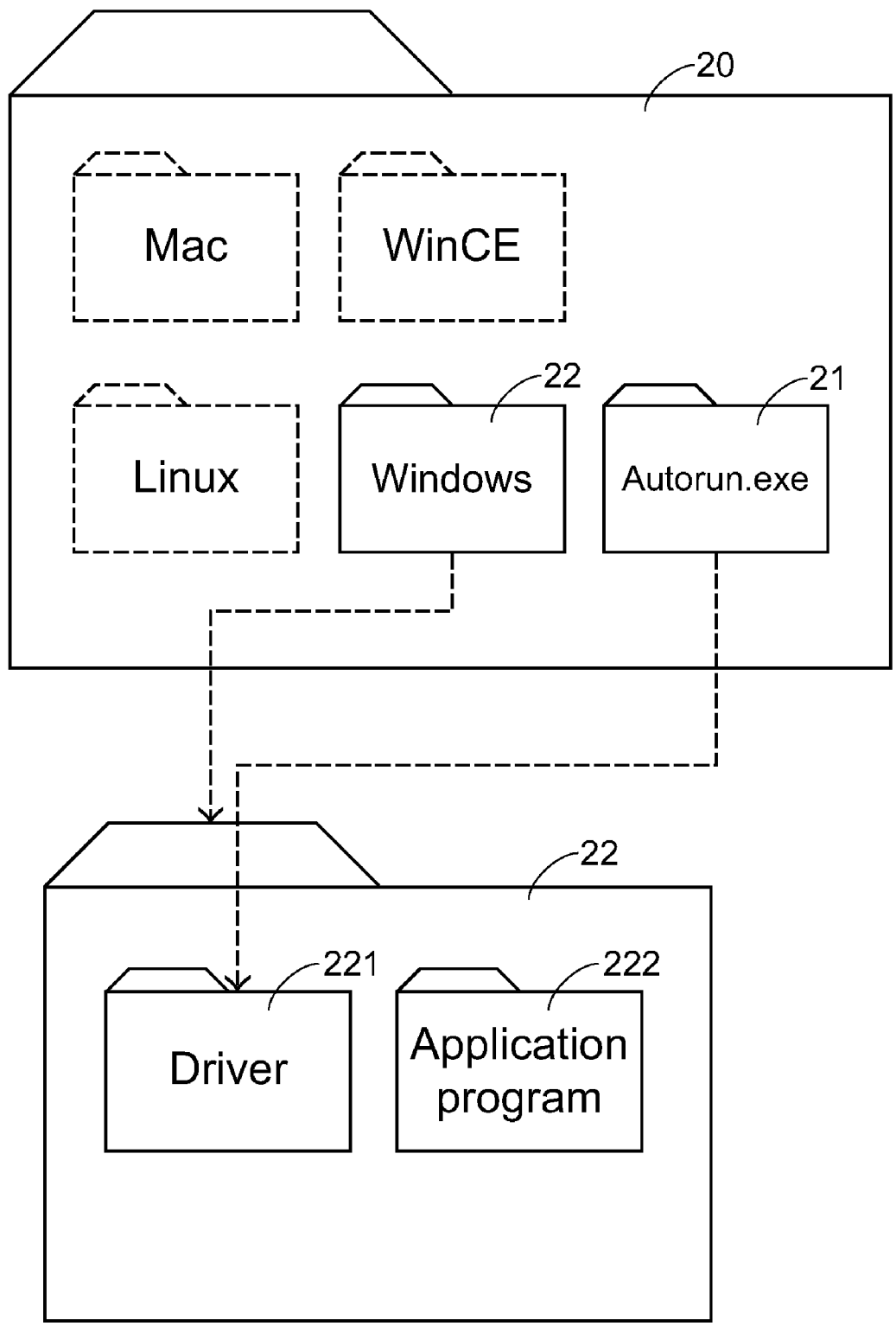
FIG. 3 is a schematic view illustrating the associated files and programs included in the TV adapter 10.

Please refer to FIG. 3, which is a schematic view illustrating the associated files and programs included in the TV adapter 10. As shown in FIG. 3, the folder 20 includes a variety of system files for different operating systems such as Mac, WinCE, Linux, and Windows. They are accessible by the corresponding operating system when the TV adapter 10 is communicated with the portable media player 11. The folder 20 further includes an autorun program (i.e. Autorun.exe) 21. For example, in a case that the portable media player 11 is operated in a Windows operating system, the driver 221 or the application program 222 contained in the Windows folder 22 are automatically downloaded into the operating system by executing the Autorun.exe 21. Alternatively, a certain program required for operating the TV adapter 10 can be manually downloaded in order to have the operating system realize the information associated with the TV adapter 10.

Alternatively, the TV adapter 10 can be recognized as a memory device, and different addresses in the memory of the TV adapter 10 are accessed by the operating system in response to different instructions to designate required operating functions. The circuitry configuration and the operating principle are similar to those described above, and are not redundantly described herein.

The present invention is illustrated by referring to a TV adapter 10 and a portable media player 11 as the external device and the backend host, respectively. Nevertheless, the present invention can be applied between another external device and backend host. For example, the operating method of the present invention is applicable between a CardBus device and a computer system, or between a mobile computing device and a functional adapter. The interface for communicating the external device with the backend host is not specifically limited as long as the external device is compatible with the backend host and the external device can be recognized as a memory device in addition to the original attributes thereof. Moreover, the driver or the application program stored in the external device can be updated to refresh the contents thereof so as to facilitate control of the external device.

From the above description, the operating method of the present invention is applicable between an external device and a backend host even if the external device is unrecognized by the backend host. Anyhow, by executing the autorun program (i.e. Autorun.exe), executing the application program or reading a data file, the external device is accessible to the backend host because the external device can be recognized as a memory device and certain information or certain program stored therein can be realized by the external device even though the external device is unrecognized by the backend host.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An operating method used between an external device and a backend host operated with an operating system, the external device storing a program therein, the program comprises a driver and an application program, the operating method comprising steps of:

connecting the external device to the backend host and recognizing the external device by the operating system;

reconnecting the external device to the backend host to have the operating system recognize the external device as a memory device when the external device is unrecognizable by the operating system, so that the program is accessible and executable by the operating system to control the external device, initializing the external device by the operating system when the external device is recognized by the operating system as the memory device, so that the driver and the application program stored in the external device are accessible to the operating system;

reconnecting the external device to the backend host after the driver is downloaded into the operating system by automatically disconnecting the communication between the external device and the backend host and then connecting the external device to the backend host to have the operating system correctly recognize the external device, thereby controlling the external device; and executing the application program provided by the external device to control the external device when the driver fails to be downloaded into the operating system but the application program is executable.

2. The operating method according to claim 1, further comprising steps of:

recognizing the external device within a predetermined time period, wherein the external device is recognizable if the operating system successfully recognizes the external device within the predetermined time period, and the external device is unrecognizable if the operating system fails to recognize the external device within the predetermined time period; and initializing the external device by the operating system when the external device is recognizable by the operating system, thereby controlling the external device.

3. The operating method according to claim 1 wherein the operating system recognizes the external device according to the identity, the identification code or other attributes of the external device, and the external device is unrecognizable by the operating system when no information associated with the external device is realized by the operating system.

4. The operating method according to claim 1 wherein the step of reconnecting the external device to the backend host includes automatically disconnecting the communication between the external device and the backend host and then connecting the external device to the backend host to have the operating system recognize the external device as a memory device.

5. The operating method according to claim 1 wherein the backend host is one of a computer system and an embedded system, and the external device is one of a CardBus device and a functional adapter.

6. An operating method used between an external device receiving incoming data and a backend host operated with an operating system, the external device has a driver and an application program stored therein, the operating method comprising steps of:

connecting the external device to the backend host and recognizing the external device by the operating system;

reconnecting the external device to the backend host to have the operating system recognize the external device as a memory device when the external device is unrecognizable by the operating system, initializing the external device by the operating system when the external device is recognized by the operating system as the memory device, so that the driver and the application program stored in the external device are accessible to the operating system;

allowing the external device to convert the incoming data into at least one data file complying with the access format of a certain program in the operating system; and executing an accessory program of the operating system to open the data file to be read or written when the driver fails to be downloaded into the operating system and the application program fails to be executed.

7. The operating method according to claim 6 wherein the operating system recognizes the external device according to the identity, the identification code or other attributes of the external device, and the external device is unrecognizable by the operating system when no information associated with the external device is realized by the operating system.

8. The operating method according to claim 6 wherein the step of reconnecting the external device to the backend host includes automatically disconnecting the communication between the external device and the backend host and then connecting the external device to the backend host to have the operating system recognize the external device as a memory device.

9. The operating method according to claim 6 wherein the incoming data are converted into the at least one data file by one operation selected from a group consisting of encoding operation, decoding operation, code conversion, data editing operation and a combination thereof.

10. The operating method according to claim 6 wherein the data file is a virtual file executable by the certain program in the operating system, so that the operating status of the external device is inquired and the operations of the external device are controlled by the operating system.

11. The operating method according to claim 6 wherein the backend host is one of a computer system and an embedded system, and the external device is one of a CardBus device and a functional adapter.

* * * * *